United States Patent Office 3,554,603
Patented Jan. 12, 1971

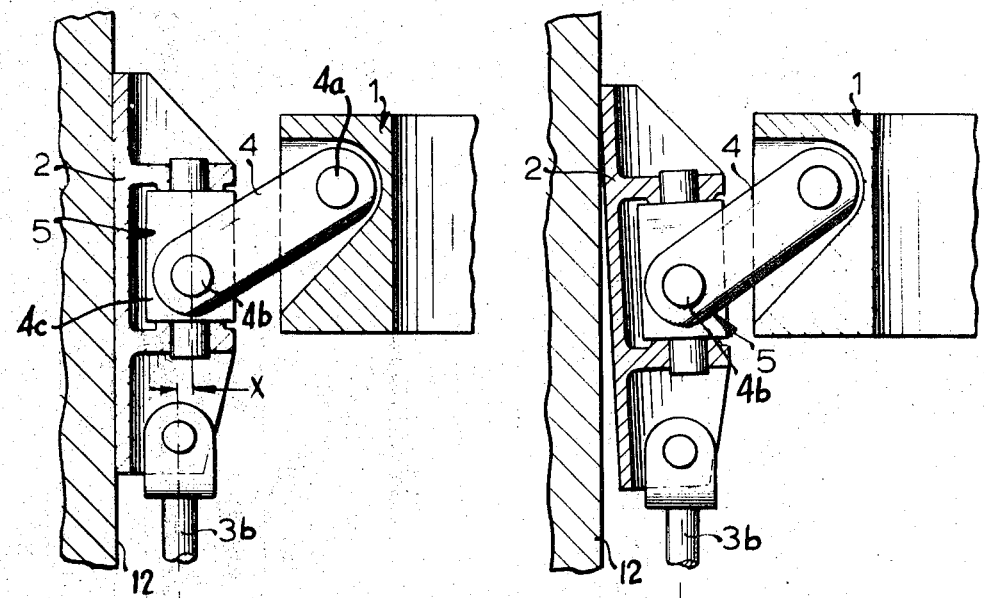
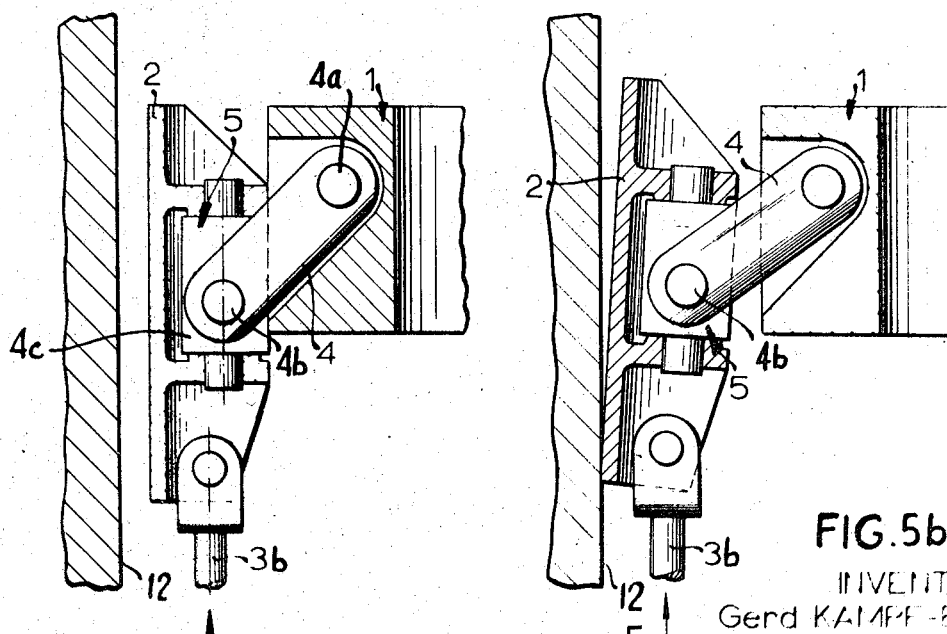

3,554,603
DEVICE FOR ANCHORING A TUNNEL DRIVING DEVICE IN A TUNNEL SHAFT
Gerd Kampf-Emden, Hosel, and Heinz Horst and Friedrich Klapdohr, Rheinhausen, Germany, assignors to Demag Aktiengesellschaft, Duisburg, Germany
Filed Feb. 19, 1969, Ser. No. 800,482
Claims priority, application Germany, June 14, 1968, 1,759,857
Int. Cl. E21b 3/12; E01q 3/04
U.S. Cl. 299—31            6 Claims

ABSTRACT OF THE DISCLOSURE

A device for clamping a driving or drilling machine in relation to a surrounding shaft or tunnel wall includes one or more claws arranged at at least two longitudinally spaced locations and connected to the drilling machine by short link elements. Each link element is provided at its one end to the drilling machine and pivoted in a universal manner to the claw at its opposite end. Two longitudinally spaced claw elements are conneted together by means of a fluid piston and cylinder connection which extends therebetween. The link connection and the fluid piston and cylinder connection to each jaw is such that when the fluid piston and cylinder applies substantially directed axial force in one direction the claws are disengaged from the wall and when it applies an axial force in an opposite direction the claws are engaged with the wall. The connection of the fluid piston and cylinder combination to each claw is at a location offset from the connection of the link member which connects the claw to the drilling machine.

SUMMARY OF THE INVENTION

This invention relates, in general, to tunnel boring devices and in particular, to a new and useful device for clamping a driving or drilling machine in relation to a shaft or tunnel by means of power driven clamping claws.

The present invention is an improvement over the prior art particularly in respect to the provision of an inexpensive device for firmly affixing a driving or drilling machine in respect to a tunnel shaft using an inexpensive and simple mechanism. With the construction of the present invention the construction costs for the clamping device is a minimum and favorable lifting and engagement of the clamping claws are easily effected. The clamping claws are connected to the drilling machine by a coupling lever and they include a front claw and a rear claw longitudinally spaced from the front claw. The two claws are connected together by a joint power drive such as a piston and cylinder unit which is effective to shift the connecting link and the claw in a manner to engage against the tunnel wall, when a force is applied in one direction; and to disengage from the tunnel wall, when the force is applied in an opposite direction. In order to facilitate the connection of the clamping jaw to the coupling lever which is connected to the drilling machine, it is preferred to provide a universal or cardan-type joint at the connection of the holding or connection link. A hooking or jamming of the clamping claws is avoided during the releasing movement by connecting the power driven piston and cylinder combination which links the forward and the rear claw together in a manner such that it acts eccentrically to the connection of the link member which connects the claw to the associated drilling machine. With such an arrangement the clamping claw will first bear against the shaft or tunnel wall unilaterally, that is, from one side only, and it will lift off in a similar manner so that one portion releases before the entire claw surface releases.

Accordingly, it is an object of the invention to provide an improved device for clamping a driving or drilling machine to a wall of a tunnel and which advantageously includes a linkage extending from the device to respective forward and rear claw members, and wherein the claw members are interconnected by a piston and cylinder combination which is expandable to provide an outward movement of each claw into engagement with the tunnel and which is retractable to release the claws from the tunnel wall.

A further object of the invention is to provide a clamping mechanism for a tunnel driving machine or drilling machine which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:
FIG. 4a is an enlarged partial sectional view of the forward claw indicating the clamping of the claw to the tunnel wall;
FIG. 4b is a view similar to FIG. 4a showing the releasing of the clamping claw from the tunnel wall;
FIG. 5a is a view similar to FIG. 4a showing the rear claw;
and
FIG. 5b is a view similar to FIG. 4b showing the rear claw.

DETAILED DESCRIPTION OF THE PREFERRED EMBODIMENT

Figure 1:
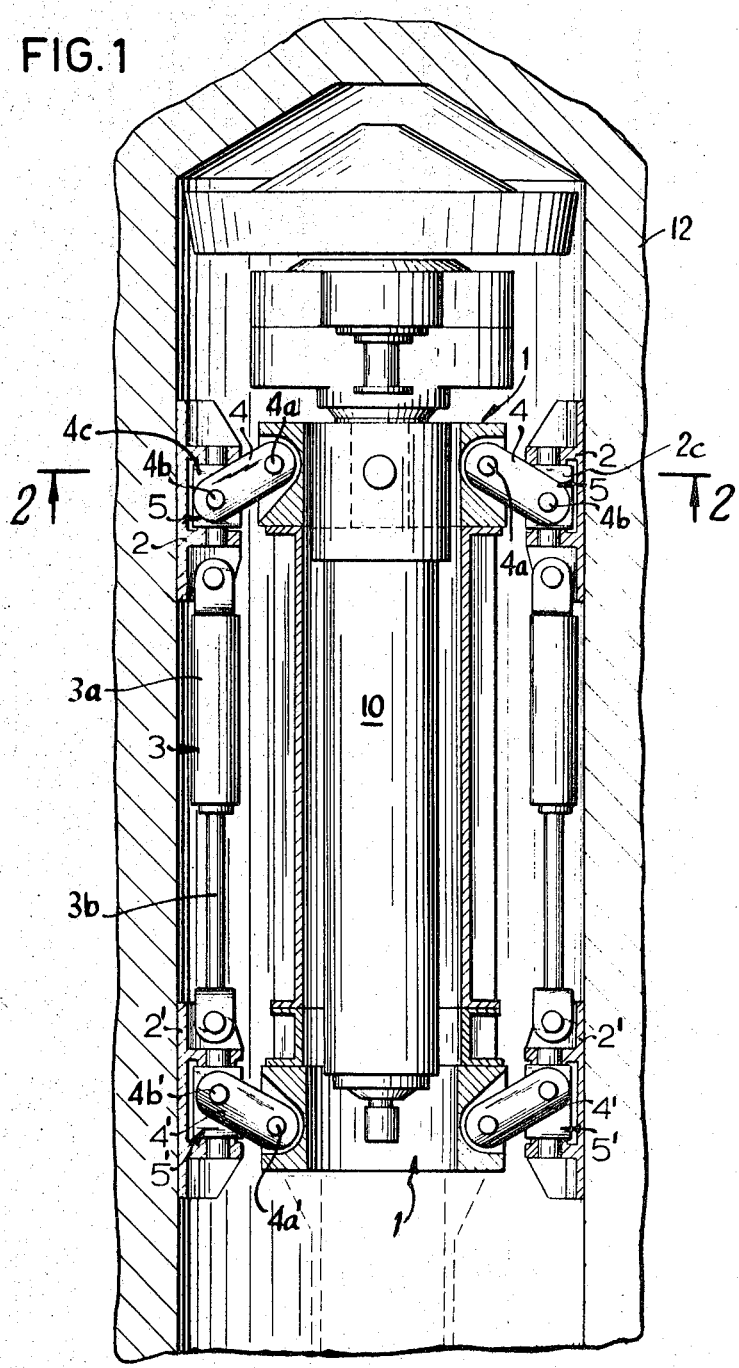
FIG. 1 is a partial sectional view of a drilling machine having a clamping device constructed in accordance with the invention.
Figure 2:
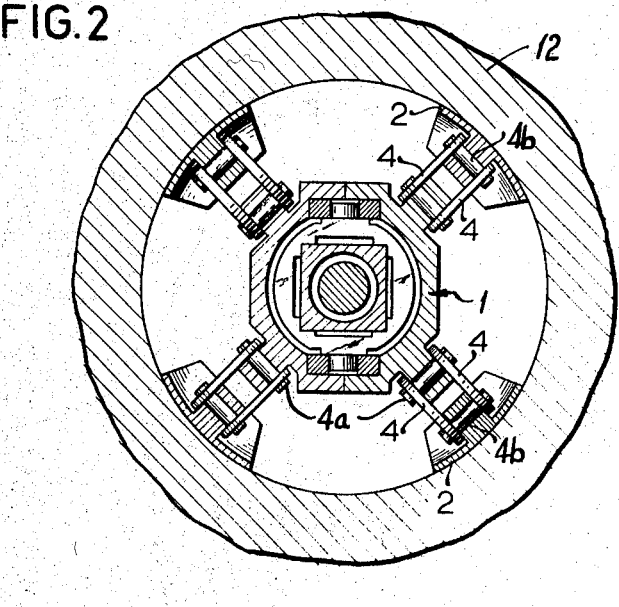
FIG. 2 is a section taken along the line II—II of FIG. 1.
Figure 3:
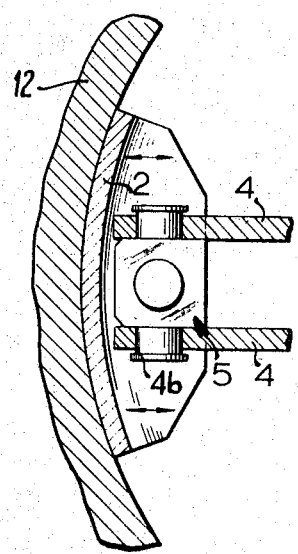
FIG. 3 is a partial section of a portion of the apparatus indicated in FIG. 2 on a large scale.

Referring to the drawings in particular, the invention embodied therein comprises a clamping apparatus which is adapted to be used for clamping a longitudinally elongated body portion 10 of a drilling or driving apparatus in position in respect to a wall 12 of a tunnel which is being driven by the apparatus. The clamping apparatus includes one or more circumferentially spaced forward clamping claws 2, 2 and one or more rear clamping claws 2', 2'. The forward clamping claws 2, 2 are articulated to the driving machine generally designated 1 by short links 4 which include a forward pivot connection 4a at one end to the driving machine and a rear pivot connection 4b at the opposite end to the claw 2. The link connection 4b is a movable cylindrical member 4c so that the resultant joint defined thereby and generally designated 5, is a cardan or universal joint.

Rear claws 2', 2' are connected through links 4' which are connected at their inner ends to a pivot link portion 4a' connected to the driving machine 1 and at their outer ends through a pivot link connection 4b' to the claw 2'. Links 4 and 4' of the forward claws 2 and the rear claws 2' thus extend obliquely so that they will intersect at an imaginary plane. The claws at the forward end 2 are connected to the rear claws 2' through a power drive generally designated 3 which includes a fluid cylinder 3a in which is movable a piston (not shown) which is connected to a piston rod 3b. When the rod 3b is moved outwardly in an expanding direction a force F as indicated in FIGS. 5a and 5b is applied to the clamping jaws 2 and 2' to cause them to engage against the tunnel wall. When the fluid piston 3 is actuated in a contracting direction to retract the piston rod 3b within the cylinder 3a the force F' is applied as indicated in FIGS. 4a and 4b which results in the removal of the claws 2 and 2' from the associated tunnel wall 12.

What is claimed is:

1. A device for clamping a tunnel driving machine or boring machine to a shaft or tunnel wall, comprising at least one first front tunnel wall engaging claw, at least one second rear tunnel wall engaging claw longitudinally spaced from said first claw, a fluid pressure operated expansible piston and cylinder combination extending between and pivotally connected to each of said first and second claws for applying an actuating force thereto for engagement and disengagement of said claws, and linkage means adapted to be carried on the driving machine and connected to each of said first and second claws at a location thereon and in a manner to cause engagement when said piston and cylinder combination applies a force in one direction and to cause disengagement when said piston and cylinder combination applies a force in an opposite direction during expansion and contraction thereof.

2. A device according to claim 1, wherein said linkage means is pivotally connected to respective ones of said first and second wall engaging claws at pivotal locations which are offset from the pivotal connections of the respective ends of said piston and cylinder combination pivotal connections to said first and second claws.

3. A device, according to claim 1, wherein said linkage means comprises a link pivotally connected to each of said claws and each having an opposite end adapted to be pivotally connected to the driving machine, the longitudinally center lines of each of said links converging at an imaginary point between said first and second claws.

4. A device, according to claim 3, wherein the pivotal connection of said links to said first and second claws comprises a universal joint.

5. A device for clamping a tunnel driving machine to the walls of the tunnel comprising a tunnel driving machine, at least one first claw located adjacent the forward end of said tunnel driving machine, at least one second claw longitudinally spaced rearwardly in respect to said first claw, a fluid pressure operated piston connected pivotally to one end of one of said claws and having a piston slidable therein with a piston rod pivotally connected at its outer end to the other of said first and second claws, said piston rod being movable out of said fluid cylinder in an expansion direction and into said cylinder in a contracting direction, a first link pivotally connected to said driving machine at its one end and having an opposite end extending obliquely in the general direction of said second claw and being pivotally connected at its opposite end to said first claw, a second link pivotally connected to said driving machine and extending obliquely in a direction toward said first link and being pivotally connected at its opposite end to said second link, the pivotal connections of said first and second links to said first and second claws respectively being offset in respect to the pivotal connections of said fluid cylinder and said piston rod to the respective first and second claws.

6. A device, according to claim 5, wherein the pivotal connections of said first and second links to said first and second claws respectively each comprise a universal joint.

References Cited

UNITED STATES PATENTS

| 2,837,325 | 6/1958 | Biedess | 299—31 |
| 2,954,211 | 9/1960 | Penrod | 175—230X |
| 3,061,287 | 10/1962 | Robbins | 299—31 |
| 3,345,108 | 10/1967 | Newman et al. | 299—31 |

ERNEST R. PURSER, Primary Examiner

U.S. Cl. X.R.

175—99